US012005697B2

(12) United States Patent
Yokoi

(10) Patent No.: US 12,005,697 B2
(45) Date of Patent: Jun. 11, 2024

(54) CLEANING DEVICE

(71) Applicant: FUJI CORPORATION, Chiryu (JP)

(72) Inventor: Yoshimune Yokoi, Kiyosu (JP)

(73) Assignee: FUJI CORPORATION, Chiryu (JP)

( * ) Notice: Subject to any disclaimer, the term of this patent is extended or adjusted under 35 U.S.C. 154(b) by 0 days.

(21) Appl. No.: 18/043,933

(22) PCT Filed: Sep. 16, 2020

(86) PCT No.: PCT/JP2020/035105
§ 371 (c)(1),
(2) Date: Mar. 3, 2023

(87) PCT Pub. No.: WO2022/059099
PCT Pub. Date: Mar. 24, 2022

(65) Prior Publication Data
US 2023/0347640 A1 Nov. 2, 2023

(51) Int. Cl.
*B41F 35/00* (2006.01)
*B41F 15/08* (2006.01)

(52) U.S. Cl.
CPC .................................. *B41F 35/003* (2013.01)

(58) Field of Classification Search
None
See application file for complete search history.

(56) References Cited

U.S. PATENT DOCUMENTS 9,919,511 B1 * 3/2018 King ...................... B65H 23/08

FOREIGN PATENT DOCUMENTS

GB 2297947 A * 8/1996 ............ B41F 35/005
JP 2011-189668 A 9/2011
JP 2019-206095 A 12/2019
KR 2003-0088759 A 11/2003
WO WO 2020/084695 A1 4/2020

OTHER PUBLICATIONS

International Search Report dated Dec. 8, 2020 in PCT/JP2020/035105 filed on Sep. 16, 2020, 3 pages).

* cited by examiner

*Primary Examiner* — Leslie J Evanisko
(74) *Attorney, Agent, or Firm* — Oblon, McClelland, Maier & Neustadt, L.L.P.

(57) ABSTRACT

A cleaning device cleans a screen mask. The cleaning device includes a cleaning sheet configured to clean the screen mask; a roll-shaped supply section configured to supply the cleaning sheet; a cleaning head configured to press the cleaning sheet supplied from the supply section against a rear surface of the screen mask; a roll-shaped winding section configured to wind a used cleaning sheet; a driving section configured to drive the winding section; a moving mechanism configured to move the supply section, the cleaning head, and the winding section in the same direction as and in an opposite direction to a supply direction of the cleaning sheet; a lifting and lowering mechanism configured to lift and lower the cleaning head; and a brake mechanism configured to allow rotation of the supply section when the cleaning head is lowered by the lifting and lowering mechanism, and to restrict rotation of the supply section when the cleaning head is lifted by the lifting and lowering mechanism.

3 Claims, 4 Drawing Sheets

CLEANING DEVICE

TECHNICAL FIELD

The technique disclosed in the present specification relates to a cleaning device. More specifically, the technique disclosed in the present specification relates to a technique for cleaning a screen mask provided in a screen printer.

BACKGROUND ART

A screen printer transfers a solder to a circuit board by using a screen mask. When the screen printer is repeatedly used, a blurred solder adheres to a rear surface of the screen mask. Thus, the screen printer includes a cleaning device for removing an excess solder adhering to the rear surface of the screen mask. For example, a cleaning device disclosed in JP-A-2011-189668 includes a cleaning sheet, a roll-shaped supply section that supplies the cleaning sheet, a cleaning head that presses the supplied cleaning sheet against a screen mask, a roll-shaped winding section that winds a used cleaning sheet, a moving device that moves the cleaning head in parallel with the screen mask, and a lifting and lowering mechanism that lifts and lowers the cleaning head. When the rear surface of the screen mask is cleaned, the cleaning head is lifted by the lifting and lowering mechanism, so that the cleaning sheet is pressed against the rear surface of the screen mask. By moving the cleaning head in this state, the solder adhering to the rear surface of the screen mask is wiped with the cleaning sheet. A motor is connected to the winding section, and by driving the motor, a used cleaning sheet is wound by the winding section, and a cleaning sheet before use is pulled out from the supply section.

The cleaning device in JP-A-2011-189668 can clean the rear surface of the screen mask in both a forward path and a return path. In the forward path, the cleaning head is moved in the same direction as a direction in which the winding section winds the cleaning sheet. Thus, the cleaning sheet is pulled toward the supply section due to friction with the screen mask caused by the movement of the cleaning head. In the forward path, the motor connected to the winding section is driven to move while winding the cleaning sheet. Consequently, it is possible to suppress slack of the cleaning sheet during the movement of the cleaning head. In the return path, the cleaning head moves in a direction opposite to the direction in which the winding section winds the cleaning sheet. Therefore, the cleaning sheet is pulled toward the winding section due to friction with the screen mask caused by the movement of the cleaning head. Thus, the cleaning device in JP-A-2011-189668 is provided with a brake mechanism that restricts rotation of the supply section. In the return path, the slack of the cleaning sheet during the movement of the cleaning head is suppressed by operating the brake mechanism.

BRIEF SUMMARY

Technical Problem

In the cleaning device in JP-A-2011-189668, the rear surface of the screen mask can be cleaned in a reciprocating manner, and in order to suppress the slack of the cleaning sheet at the time of cleaning, the motor connected to the winding section is driven in the forward path, and the brake mechanism is operated in the return path. Thus, in the cleaning device of the related art, it is necessary to control the lifting/lowering and the movement of the cleaning head as well as to control each of the motor and the brake mechanism in accordance with a direction in which the cleaning head is moved, and thus the control mechanism of the cleaning device is complicated.

The present specification discloses a technique for facilitating a control mechanism for preventing slack of a cleaning sheet.

Solution to Problem

A cleaning device disclosed in the present specification cleans a screen mask. The cleaning device includes a cleaning sheet configured to clean the screen mask; a roll-shaped supply section configured to supply the cleaning sheet; a cleaning head configured to press the cleaning sheet supplied from the supply section against a rear surface of the screen mask; a roll-shaped winding section configured to wind a used cleaning sheet; a driving section configured to drive the winding section; a moving mechanism configured to move the supply section, the cleaning head, and the winding section in the same direction as and in an opposite direction to a supply direction of the cleaning sheet; a lifting and lowering mechanism configured to lift and lower the cleaning head; and a brake mechanism configured to allow rotation of the supply section when the cleaning head is lowered by the lifting and lowering mechanism, and to restrict rotation of the supply section when the cleaning head is lifted by the lifting and lowering mechanism.

In the above cleaning device, the brake mechanism restricts the rotation of the supply section in interlocking with the lifting of the cleaning head by the lifting and lowering mechanism. That is, while the cleaning head is lifted, the rotation of the supply section is restricted by the brake mechanism. The rotation of the supply section may be restricted while the screen mask is cleaned by the cleaning sheet. During the cleaning of the screen mask, the cleaning head is lifted. Thus, by operating the brake mechanism while the cleaning head is lifted, it is possible to restrict the rotation of the supply section during the cleaning of the screen mask. Since the lifting of the cleaning head and the restriction of the rotation of the supply section are interlocked with each other, it is unnecessary to separately control the lifting and lowering mechanism and the brake mechanism, so that it is possible to prevent a control mechanism of the cleaning device from being complicated.

DESCRIPTION OF EMBODIMENTS

Main features of embodiments described below are listed below. Technical elements described below are independent technical elements, respectively, and exhibit technical usefulness alone or by various combinations, and are not limited to the combinations disclosed in the claims at the time of filing.

In the cleaning device disclosed in the present specification, the lifting and lowering mechanism may include a first air cylinder that lifts and lowers the cleaning head with air. The brake mechanism may include a contact section that can contact the supply section, and a second air cylinder that is driven with air to a contact position at which the contact section contacts the supply section and a separation position that is separated from the supply section. Air may be supplied to the second air cylinder from a second air passage branched from a first air passage for supplying air to the first air cylinder. With such a configuration, it is possible to appropriately realize a configuration for restricting rotation of the supply section in cooperation with the lifting of the cleaning head. By supplying air from the second air passage branched from the first air passage for supplying air to the first air cylinder to the second air cylinder, the configuration for supplying air to the second air cylinder can be simplified, so that the number of components can be reduced and the cost can be reduced.

Embodiments

Figure 1:
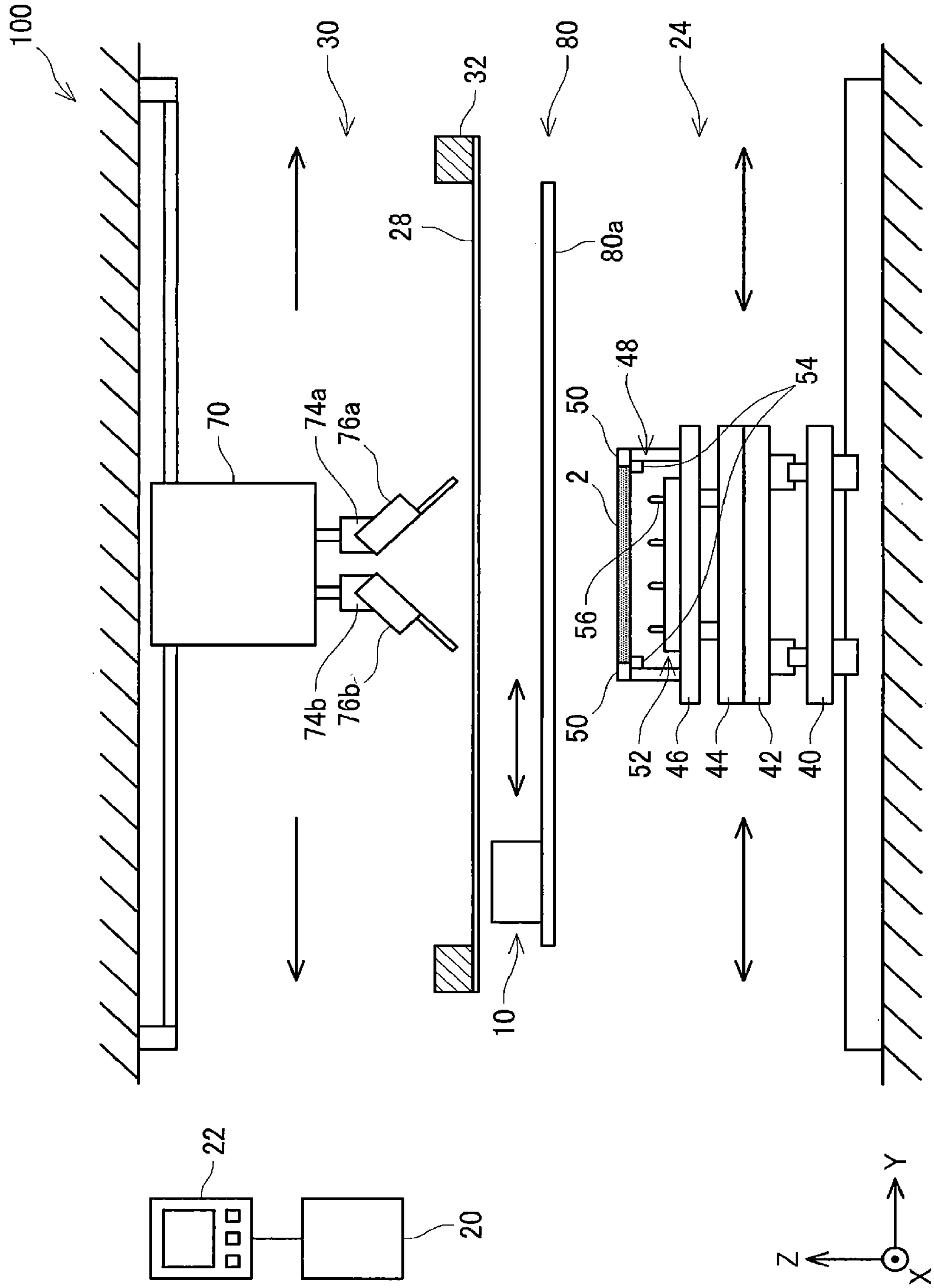
FIG. 1 is a diagram illustrating a schematic configuration of a screen printer including a cleaning device according to an embodiment.

Cleaning device 10 according to an embodiment will be described with reference to the drawings. Cleaning device 10 is installed in screen printer 100. As illustrated in FIG. 1, screen printer 100 includes control device 20, interface device 22, circuit board positioning device 24, screen mask 28, squeegee device 30, and cleaning device 10. Screen printer 100 receives circuit board 2 from the upstream side of a mounting line, performs screen printing of a desired solder on circuit board 2, and then sends circuit board 2 to the downstream side of the mounting line. In the following description, in screen printer 100, a conveyance direction of circuit board 2 is defined as an X direction, a direction perpendicular to the X direction in the horizontal plane is defined as a Y direction, and a direction perpendicular to the X direction and the Y direction is defined as a Z direction.

Circuit board positioning device 24 includes Y-direction moving mechanism 40, X-direction moving mechanism 42, rotation mechanism 44, lifting and lowering mechanism 46, X-direction conveyance mechanism 48, clamp mechanism 50, and support mechanism 52.

Y-direction moving mechanism 40 is supported by a base of screen printer 100. Y-direction moving mechanism 40 can be moved relative to the base of screen printer 100 in the Y direction due to driving of an actuator (not illustrated).

X-direction moving mechanism 42 is supported by Y-direction moving mechanism 40. X-direction moving mechanism 42 can be moved relative to Y-direction moving mechanism 40 in the X direction due to driving of an actuator (not illustrated).

Rotation mechanism 44 is supported by X-direction moving mechanism 42. Rotation mechanism 44 can be rotated relative to X-direction moving mechanism 42 about the Z-axis due to driving of a motor (not illustrated).

Lifting and lowering mechanism 46 is supported by rotation mechanism 44. Lifting and lowering mechanism 46 can be moved relative to rotation mechanism 44 in the Z direction due to driving of an actuator (not illustrated).

X-direction conveyance mechanism 48, clamp mechanism 50, and support mechanism 52 are supported by lifting and lowering mechanism 46. X-direction conveyance mechanism 48 includes a pair of conveyor belts 54 disposed along the X-direction, and a servo motor (not illustrated) for driving each conveyor belt 54. Both ends of circuit board 2 in the Y direction are placed on the pair of conveyor belts 54, and circuit board 2 is conveyed in the X direction by driving the servo motor. A gap between the pair of conveyor belts 54 is adjustable according to a size of circuit board 2.

Clamp mechanism 50 can hold circuit board 2 at a desired width by sandwiching circuit board 2 from both ends in the Y direction. Support mechanism 52 can support circuit board 2 from the lower surface side by causing multiple support pins 56 to contact the lower surface of circuit board 2 held by clamp mechanism 50.

Screen mask 28 is a metallic plate-like member formed in a rectangular shape, and is supported on four sides by mask support frame 32 of which a position is fixed with respect to the base of screen printer 100. An opening portion is formed in a center portion of screen mask 28 so as to correspond to a pattern of a solder to be printed on circuit board 2. Hereinafter, openings formed in screen mask 28 will also be referred to as a printing pattern.

Squeegee device 30 includes Y-direction moving mechanism 70, squeegee heads **74*a* and 74*b*, and squeegees 76*a* and 76*b***.

Y-direction moving mechanism 70 is supported by the base of screen printer 100. Y-direction moving mechanism 70 can be moved relative to the base in the Y direction due to driving of an actuator (not illustrated).

Squeegee heads **74*a* and 74*b* are supported by Y-direction moving mechanism 70. Squeegee heads 74*a* and 74*b* can be moved relative to Y-direction moving mechanism 70** in the Z direction due to driving of an actuator (not illustrated).

Squeegee **76*a* is supported by squeegee head 74*a*. Squeegee 76*a* is tiltable with respect to squeegee head 74*a* by the driving of a servo motor (not illustrated). Squeegee 76*b* is supported by squeegee head 74*b*. Squeegee 76*b* is tiltable with respect to squeegee head 74*b* due to driving of the servo motor (not illustrated). Squeegees 76*a* and 76*b* squeeze a solder supplied from a solder supply device (not illustrated) to the upper surface of screen mask 28** on the printing pattern.

Figure 2:
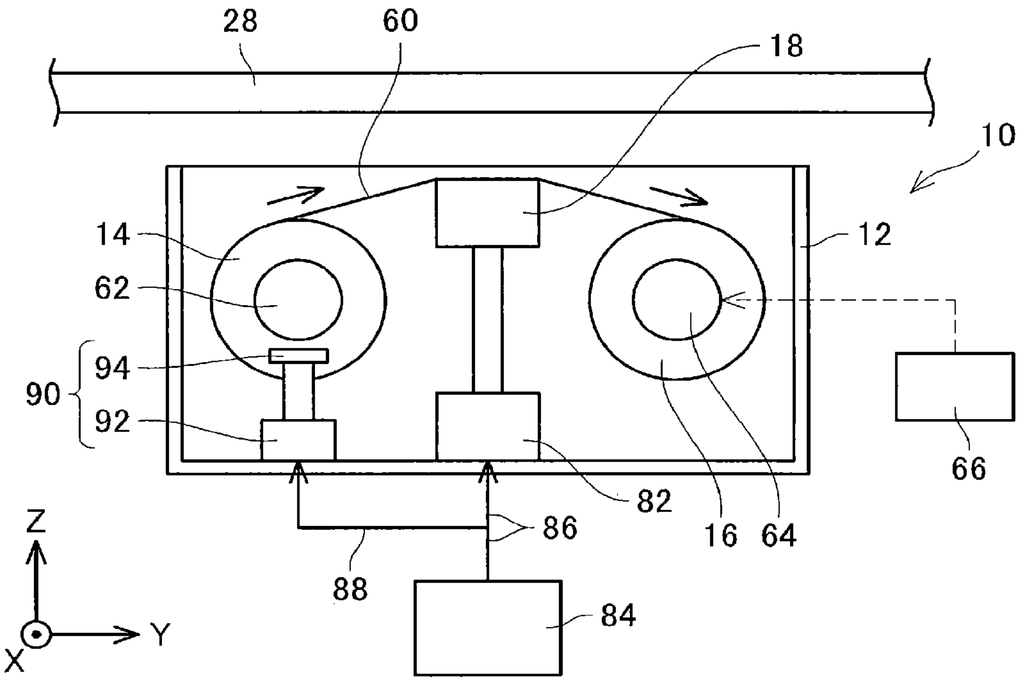
FIG. 2 is a diagram illustrating a schematic configuration of the cleaning device according to the embodiment, and illustrates a state in which a cleaning head is lowered.
Figure 3:
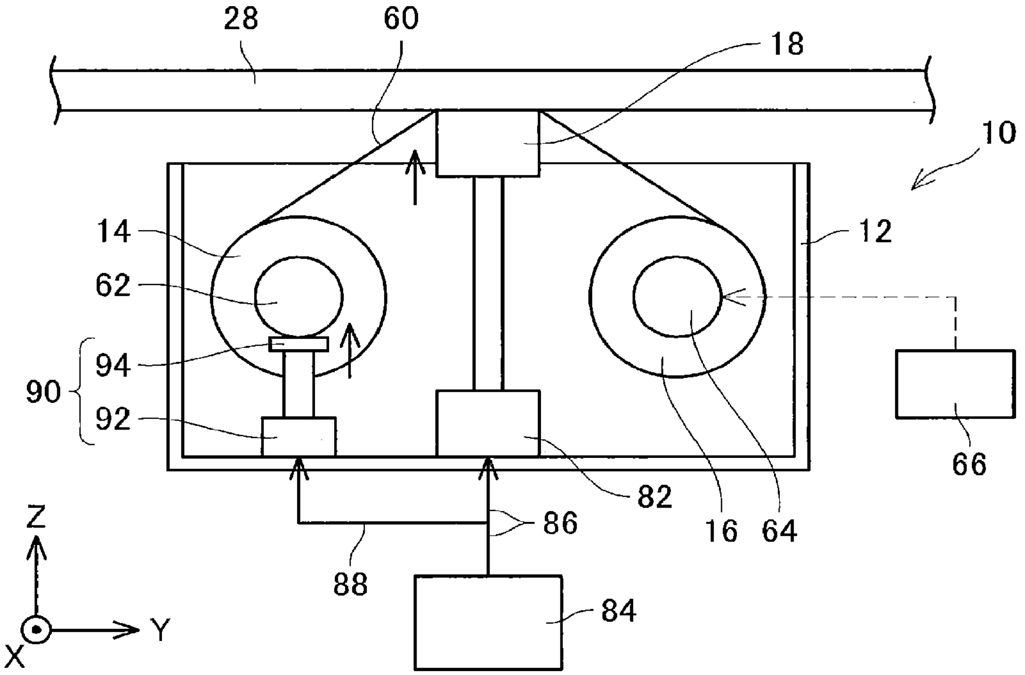
FIG. 3 is a diagram illustrating a schematic configuration of the cleaning device according to the embodiment, and illustrates a state in which the cleaning head is lifted.

Cleaning device 10 is disposed between circuit board positioning device 24 and screen mask 28. As illustrated in FIGS. 2 and 3, cleaning device 10 includes main body 12, supply roll 14, winding roll 16, cleaning head 18, cleaning sheet 60, Y-direction moving mechanism 80 (refer to FIG. 1), lifting and lowering air cylinder 82, and brake mechanism 90.

Supply roll 14 is cylindrical and detachably attached to supply support section 62. Supply support section 62 is rotatably supported by main body 12, and supply roll 14 is rotated integrally with supply support section 62. Elongated cleaning sheet 60 is wound around supply roll 14. As supply roll 14 is rotated, cleaning sheet 60 before use is pulled out from supply roll 14. Specifically, a driving section such as a motor is not connected to supply support section 62. Thus, as will be described later, cleaning sheet 60 wound on supply roll 14 is pulled in the direction in which cleaning sheet 60 is pulled out, so that supply roll 14 and supply support section 62 are rotated, and thus cleaning sheet 60 is pulled out in accordance with the rotation.

Winding roll 16 is cylindrical and detachably attached to winding support section 64. Winding support section 64 is rotatably supported by main body 12, and winding roll 16 is rotated integrally with winding support section 64. Motor 66 is connected to winding support section 64, and winding support section 64 is rotated due to driving of motor 66. As winding roll 16 is rotated, cleaning sheet 60 is supplied from supply roll 14, and used cleaning sheet 60 is wound on winding roll 16. Winding support section 64 and winding roll 16 are rotated by motor 66, so that cleaning sheet 60 is wound, and thus cleaning sheet 60 is pulled to rotate supply roll 14 and supply support section 62.

Cleaning head 18 is disposed between supply roll 14 and winding roll 16, and contacts the lower surface of cleaning sheet 60 between supply roll 14 and winding roll 16. Specifically, cleaning sheet 60 stretched between supply roll 14 and winding roll 16 contacts the upper surface of cleaning head 18 at the intermediate position. As illustrated in FIG. 3, when cleaning head 18 is lifted by lifting and lowering air cylinder 82 that will be described later, cleaning sheet 60 located on the upper surface of cleaning head 18 is pressed against the rear surface of screen mask 28.

Cleaning sheet 60 is a porous paper having hygroscopic property and is wound on supply roll 14. In the present embodiment, although paper is used for cleaning sheet 60, a material is not limited to this as long as the material can wipe a solder. Cleaning sheet 60 is supplied from supply roll 14, supported by the upper surface of cleaning head 18, and is wound on winding roll 16.

Supply roll 14, cleaning head 18, and winding roll 16 are disposed in an order of supply roll 14, cleaning head 18, and winding roll 16 along the Y direction (specifically, from the −Y direction to the +Y direction). Therefore, cleaning sheet 60 is sent in the +Y direction.

As illustrated in FIG. 1, the Y-direction moving mechanism 80 is supported by the base (not illustrated) of screen printer 100. Y-direction moving mechanism 80 includes a pair of conveyor belts 80*a* (in FIG. 1, only one of the pair of conveyor belts 80*a* is illustrated) disposed along the Y-direction, and a servo motor (not illustrated) for driving each conveyor belt 80*a*. By driving the servo motor, main body 12 (and the members such as supply roll 14, winding roll 16, and cleaning head 18 supported by main body 12) is moved in the Y direction. Y-direction moving mechanism 80 is capable of reciprocating main body 12 in the Y direction. In other words, Y-direction moving mechanism 80 can move main body 12 in the same direction as the direction in which cleaning sheet 60 is supplied (that is, the +Y direction) (hereinafter, movement in this direction will also be referred to as a "forward path") and can move main body 12 in the direction opposite to the direction in which cleaning sheet 60 is supplied (that is, the −Y direction) (hereinafter, movement in this direction will also be referred to as a "return path").

As illustrated in FIGS. 2 and 3, lifting and lowering air cylinder 82 is fixed to a bottom plate of main body 12. Lifting and lowering air cylinder 82 is connected to air supply section 84 via first air passage 86. Lifting and lowering air cylinder 82 lifts cleaning head 18 by air being supplied from air supply section 84 through first air passage 86. When cleaning head 18 is lifted by lifting and lowering air cylinder 82, cleaning sheet 60 located on the upper surface of cleaning head 18 is pressed against the rear surface of screen mask 28.

Brake mechanism 90 is configured to be able to restrict rotation of supply roll 14. Brake mechanism 90 includes brake air cylinder 92 and contact section 94.

Brake air cylinder 92 is fixed to the bottom plate of main body 12 in the vicinity of supply roll 14 (in FIGS. 2 and 3, below supply roll 14). Brake air cylinder 92 is connected to first air passage 86 via second air passage 88. That is, second air passage 88 branches from first air passage 86. Brake air cylinder 92 moves contact section 94 by air being supplied from air supply section 84 through a part of first air passage 86 and second air passage 88 branching from first air passage 86.

Contact section 94 is attached to a distal end of a piston of brake air cylinder 92 and is disposed below supply support section 62. As the piston of brake air cylinder 92 expands and contracts, contact section 94 is moved between a contact position (refer to FIG. 3) contacting supply support section 62 and a separation position (refer to FIG. 2) separated from supply support section 62. Specifically, when air is supplied to brake air cylinder 92, contact section 94 is moved to the contact position. When the air supplied to brake air cylinder 92 is exhausted, contact section 94 is moved to the separation position, so that supply support section 62 and supply roll 14 are rotatable. When contact section 94 is moved to the contact position, contact section 94 is pressed against supply support section 62, and thus the rotation of supply support section 62 and supply roll 14 is restricted.

As described above, second air passage 88 branches from first air passage 86. Thus, the air supplied from air supply section 84 is supplied to lifting and lowering air cylinder 82 through first air passage 86, and is also supplied to brake air cylinder 92 through second air passage 88 branching from first air passage 86. As illustrated in FIG. 3, when air is supplied from air supply section 84, cleaning head 18 is lifted by lifting and lowering air cylinder 82, and contact section 94 is moved to the contact position by brake air cylinder 92. Thus, the rotation of supply roll 14 is restricted while cleaning sheet 60 located on the upper surface of cleaning head 18 is pressed against the rear surface of screen mask 28. On the other hand, as illustrated in FIG. 2, when air is not supplied from air supply section 84 (that is, when air is exhausted from lifting and lowering air cylinder 82 and brake air cylinder 92), cleaning head 18 is lowered and contact section 94 is moved to the separation position. Thus, the rotation of supply roll 14 is allowed while cleaning sheet 60 located on the upper surface of cleaning head 18 is separated from the rear surface of screen mask 28.

Figure 4:
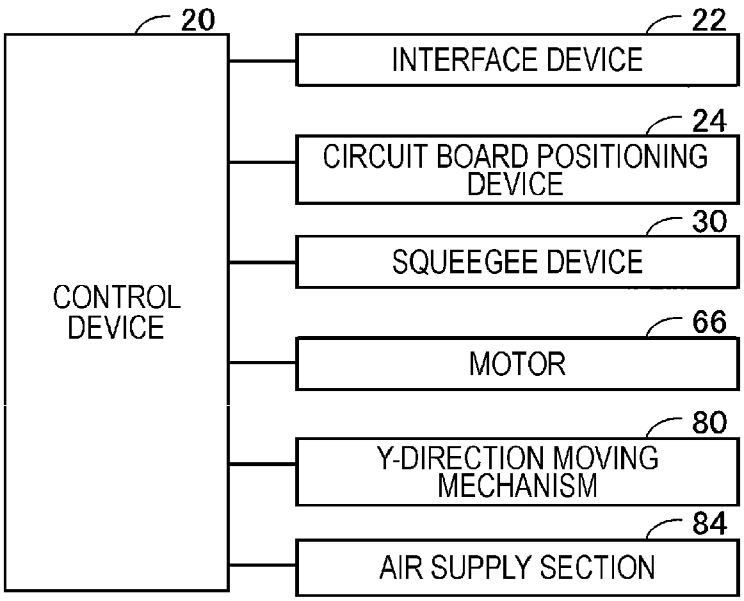
FIG. 4 is a block diagram illustrating a control system of the screen printer.

Control device 20 includes a storage device that stores a program or the like, a processor that executes the program stored in the storage device, and a communication device that communicates with a production management computer (not illustrated) that manages the entire operation of the mounting line. Control device 20 controls operations of the constituent elements of screen printer 100 in response to instructions from the production management computer. Specifically, as illustrated in FIG. 4, control device 20 is connected to interface device 22, circuit board positioning device 24, squeegee device 30, motor 66, Y-direction moving mechanism 80, and air supply section 84, and controls interface device 22, circuit board positioning device 24, squeegee device 30, motor 66, Y-direction moving mechanism 80, and air supply section 84. Control device 20 transmits data indicating a state of solder printing work in screen printer 100 to the production management computer.

Interface device 22 displays a setting state and a work state of screen printer 100 to an operator via a monitor or the like, and receives various inputs from the operator via a switch or the like.

Next, a process in which cleaning device 10 cleans the rear surface of screen mask 28 will be described. As described above, Y-direction moving mechanism 80 reciprocates main body 12 in the Y direction. Therefore, cleaning device 10 cleans the rear surface of screen mask 28 in both the forward path and the return path. During the cleaning, main body 12 is moved in a state in which cleaning sheet 60 located on the upper surface of cleaning head 18 is pressed against the rear surface of screen mask 28. Then, contact region 60*a* of cleaning sheet 60 that contacts screen mask 28 (refer to FIGS. 5 and 6) is pulled in the direction opposite to the movement direction of main body 12 due to friction with screen mask 28. Cleaning sheet 60 is pulled by screen mask 28, and thus cleaning sheet 60 is slackened. In order to suppress the slack of cleaning sheet 60, control device 20 executes the following process.

Figure 5:
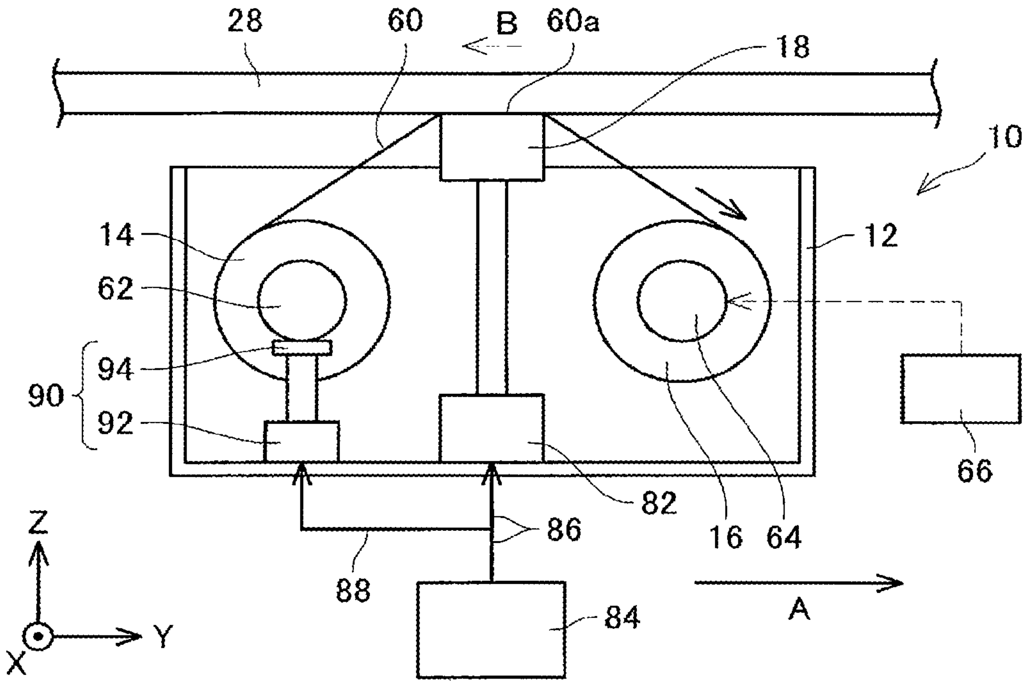
FIG. 5 is a drawing for describing a process of cleaning a rear surface of a screen mask, and illustrates a case where cleaning is performed in a forward path.

First, with reference to FIG. 5, a process performed by control device 20 in a case where the rear surface of screen mask 28 is cleaned in the forward path will be described. When cleaning is performed in the forward path, first, control device 20 causes air supply section 84 to supply air. Then, as illustrated in FIG. 5, the air supplied from air supply section 84 is supplied to lifting and lowering air cylinder 82 through first air passage 86, so that cleaning head 18 is lifted by lifting and lowering air cylinder 82. The air supplied from air supply section 84 is also supplied to brake air cylinder 92 through second air passage 88 branching from first air passage 86. Consequently, contact section 94 is moved from the separation position to the contact position, so that the rotation of supply support section 62 and supply roll 14 is restricted.

Next, control device 20 controls the Y-direction moving mechanism 80 to move main body 12 in the +Y direction (a direction denoted by the arrow A), and drives motor 66 by causing a current to flow through motor 66. Consequently, rotational positions of winding support section 64 and winding roll 16 are maintained. When motor 66 is driven, a force for rotation in the direction of winding cleaning sheet 60 is applied to winding support section 64, but since the rotation of supply roll 14 is restricted by brake mechanism 90 as described above, cleaning sheet 60 is also restricted from being wound due to rotation of winding support section 64 and winding roll 16. Thus, when motor 66 is driven, winding support section 64 and winding roll 16 are not rotated, but cleaning sheet 60 is pulled in the +Y direction, which is the direction in which cleaning sheet 60 is wound. Therefore, the rotational positions of winding support section 64 and winding roll 16 are maintained.

In the forward path, Y-direction moving mechanism 80 moves main body 12 in the same direction as the supply direction of cleaning sheet 60 (the direction denoted by the arrow A). Then, contact region 60*a* is pulled in a direction opposite to the direction in which main body 12 is moved (the direction denoted by the arrow A) (a direction denoted by the arrow B) due to friction with screen mask 28. In this case, when motor 66 is not driven, contact region 60*a* is pulled in the direction denoted by the arrow B, so that winding support section 64 is rotated in the opposite direction to the supply direction, and thus cleaning sheet 60 is slackened. In the present embodiment, in the forward path, motor 66 is controlled to apply a force for rotation in the direction in which cleaning sheet 60 is wound to winding support section 64 and winding roll 16. Consequently, cleaning sheet 60 can be pulled in a direction opposite to the direction in which contact region 60*a* is pulled due to the friction with screen mask 28 (the direction denoted by the arrow B), so that slack of cleaning sheet 60 caused by the movement of main body 12 can be suppressed.

Figure 6:
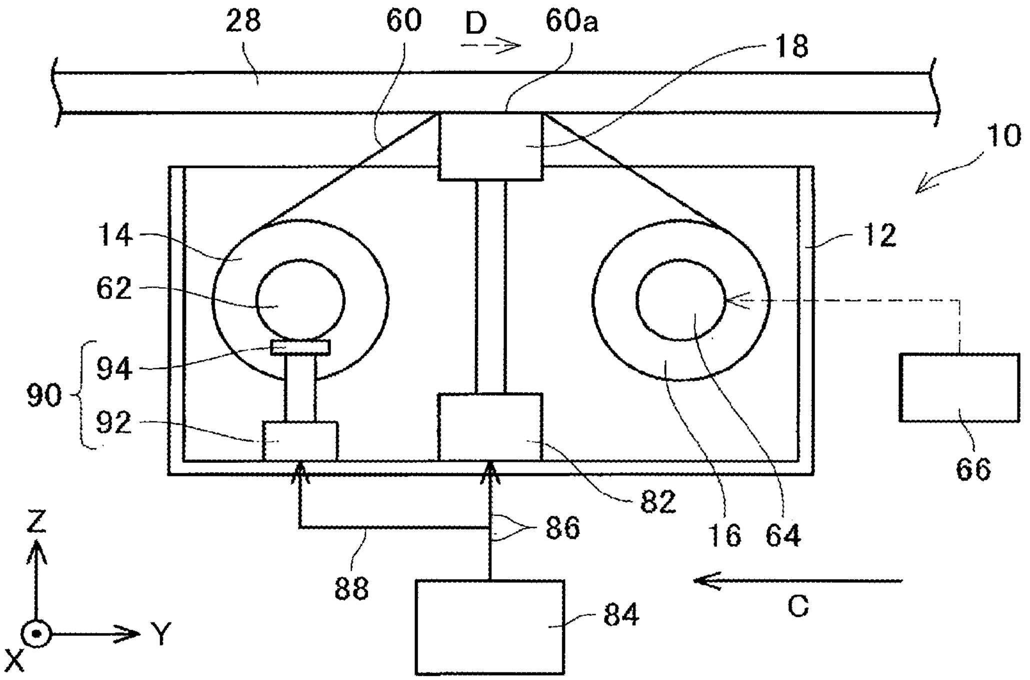
FIG. 6 is a drawing for describing a process of cleaning the rear surface of the screen mask, and illustrates a case where cleaning is performed in a return path.

Next, a process performed by control device 20 in a case where the rear surface of screen mask 28 is cleaned in the return path will be described with reference to FIG. 6. Also when cleaning is performed in the return path, control device 20 first causes air supply section 84 to supply air. Then, also in the case illustrated in FIG. 6 in the same manner as in FIG. 5, the air supplied from air supply section 84 is supplied to lifting and lowering air cylinder 82 through first air passage 86, so that cleaning head 18 is lifted by lifting and lowering air cylinder 82. The air supplied from air supply section 84 is also supplied to brake air cylinder 92 through second air passage 88 branching from first air passage 86. Consequently, contact section 94 is moved from the separation position to the contact position, so that the rotation of supply support section 62 and supply roll 14 is restricted. Next, control device 20 controls Y-direction moving mechanism 80 to move main body 12 in the −Y direction (a direction denoted by the arrow C).

In the return path, Y-direction moving mechanism 80 moves main body 12 in a direction opposite to the supply direction of cleaning sheet 60 (the direction denoted by the arrow C). Then, contact region 60*a* is pulled in a direction (a direction denoted by the arrow D) opposite to the direction in which main body 12 is moved (the direction denoted by the arrow C) due to friction with screen mask 28. In this case, in a case where the rotation of supply roll 14 is not restricted by brake mechanism 90, contact region 60*a* is pulled in the direction denoted by the arrow D, so that supply roll 14 is rotated in the supply direction and cleaning sheet 60 is slackened.

In the present embodiment, since second air passage 88 for supplying air to brake air cylinder 92 branches from first air passage 86 for supplying air to lifting and lowering air cylinder 82, when cleaning head 18 is lifted, the rotation of supply roll 14 is simultaneously restricted by the braking mechanism 90. Thus, even if contact region 60*a* is pulled in the direction (the direction denoted by the arrow D) opposite to the direction in which main body 12 is moved (the direction denoted by the arrow C) in the return path, the rotation of supply roll 14 is restricted by brake mechanism 90, so that the slack of cleaning sheet 60 caused by the movement of main body 12 can be suppressed.

In the present embodiment, since the lifting of cleaning head 18 and the restriction of the rotation of supply roll 14 are interlocked with each other, it is unnecessary to separately control the lifting of cleaning head 18 and the restriction of the rotation of supply roll 14. Consequently, it is possible to prevent the control of control device 20 from being complicated.

In the present embodiment, second air passage 88 for supplying air to brake air cylinder 92 branches from first air passage 86 for supplying air to lifting and lowering air cylinder 82. In a case where an air passage for supplying air from air supply section 84 to brake air cylinder 92 is provided completely separately from first air passage 86 for supplying air to lifting and lowering air cylinder 82, it is necessary to provide a member for adjusting the supply of air from air supply section 84 to brake air cylinder 92, such as a valve, separately from a member for adjusting the supply of air from air supply section 84 to lifting and lowering air cylinder 82. In the present embodiment, since it is only necessary to supply air to brake air cylinder 92 when air is supplied to lifting and lowering air cylinder 82, it is unnecessary to provide a member for adjusting the supply of air from air supply section 84 to brake air cylinder 92. Thus, the configuration for supplying air to brake air cylinder 92 can be simplified, and cost can also be reduced by reducing the number of components.

Notes regarding cleaning device 10 described in the embodiment will be described. Supply roll 14 of the embodiment is an example of a "supply section", winding roll 16 is an example of a "winding section", motor 66 is an example of a "driving section", Y-direction moving mechanism 80 is an example of a "moving mechanism", lifting and lowering air cylinder 82 is an example of a "first air cylinder", and brake air cylinder 92 is an example of a "second air cylinder".

Although specific examples of the technique disclosed in the present specification have been described in detail above, they are merely examples and are not intended to limit the scope of the claims. The technique described in the scope of the claims includes various modifications and changes of the specific examples described above. The technical elements described in the present specification or the drawings exhibit technical usefulness alone or in various combinations and are not limited to the combinations described in the claims at the time of filing. The technique exemplified in the present specification or the drawings simultaneously achieves multiple purposes, and has technical usefulness with achieving one purpose itself of the multiple purposes.

The invention claimed is:

1. A cleaning device that cleans a screen mask, comprising:

a cleaning sheet configured to clean the screen mask;

a roll-shaped supply section configured to supply the cleaning sheet;

a cleaning head configured to press the cleaning sheet supplied from the supply section against a rear surface of the screen mask;

a roll-shaped winding section configured to wind a used cleaning sheet;

a driving section configured to drive the winding section;

a main body that rotatably supports the supply section and the winding section, the main body including a bottom interior plate;

a moving mechanism configured to move the supply section, the cleaning head, and the winding section in the same direction as and in an opposite direction to a supply direction of the cleaning sheet;

a lifting and lowering mechanism fixed to the bottom interior plate and configured to lift and lower the cleaning head relative to the bottom interior plate, the lifting and lowering mechanism including a first air cylinder; and a brake mechanism configured to allow rotation of the supply section when the cleaning head is lowered by the lifting and lowering mechanism, and to restrict rotation of the supply section when the cleaning head is lifted by the lifting and lowering mechanism, the brake mechanism including a second air cylinder fixed to the bottom interior plate and configured to move the brake mechanism relative to the bottom interior plate.

2. The cleaning device according to claim 1, wherein the first air cylinder is configured to lift and lower the cleaning head with air, the brake mechanism includes a contact section configured to contact with the supply section, and the second air cylinder is configured to drive the contact section with air to a contact position where the contact section contacts the supply section and a separation position where the contact section is separated from the supply section, and air is supplied to the second air cylinder from a second air passage that branches from a first air passage through which air is supplied to the first air cylinder.

3. The clean device according to claim 2, further comprising:

an air supply section configured to supply the air to the first air passage and to the second air passage, wherein when the air supply section supplies the air to the first air passage and to the second air passage, the cleaning head is lifted and the contact section is moved to the contact position, and when the air supply section does not supply the air and the air is exhausted from the first air cylinder and the second air cylinder, the cleaning head is lowered and the contact section is moved to the separation position.

* * * * *